Figure 1:
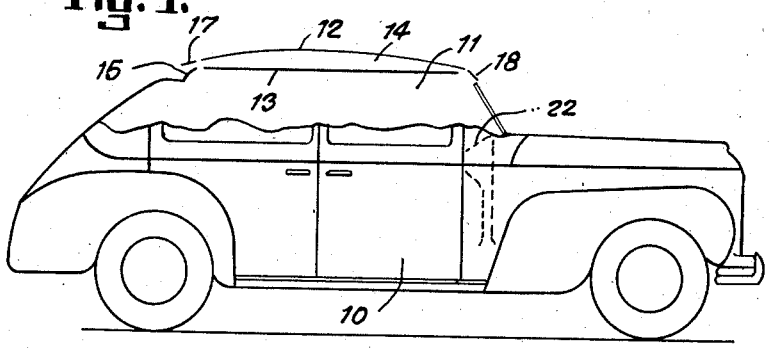

Nov. 12, 1940.  L. HOENINGHAUSEN  2,221,449

REAR VISION MIRROR

Filed April 2, 1940

INVENTOR
Leverette Hoeninghausen
BY Arthur J. Dannell
ATTORNEY

Patented Nov. 12, 1940

2,221,449

UNITED STATES PATENT OFFICE 2,221,449

REAR VISION MIRROR

Leverette Hoeninghausen, Jackson Heights, N. Y.

Application April 2, 1940, Serial No. 327,374

1 Claim. (Cl. 88—86)

The present invention relates to rear vision mirrors, and more particularly to that type of mirror adapted to be used in automobiles or the like.

The object of the invention is to provide a device which is inexpensive to manufacture, durable in operation, and much more efficient than any present type of mirror now in use.

Another object of the present invention is to provide a device which consists primarily of a large convex mirror mounted substantially near the roof of an automobile, and due to its convexity, will cover a field of substantially 180° degrees, and will transmit the view reflectively thru a plurality of mirrors, to a prismatic mirror on the dash board adjacent to the driver.

The rear vision mirrors now in use on the present type of car consists of a small adjustable mirror above the head of the driver, and normally adjusted to receive the field of vision coming thru the rear window of the car. This type of mirror is very inefficient, in that the mirror is usually out of focus when needed or else the people riding in the back seat obstruct the vision thru the rear window. The rear windows are also being made larger, which indicates the need for more rear vision.

The present invention will obviate these difficulties by having the mirrors all located in a desirable place, free from obstruction, and once they are all properly adjusted, they can be permanently set for use.

Other objects and advantages of the present invention will be obvious as brought out in the following specification.

Reference will be had to the accompanying drawing forming a part of this specification in which similar reference characters indicate corresponding parts throughout the several views, wherein—

Figure 2:
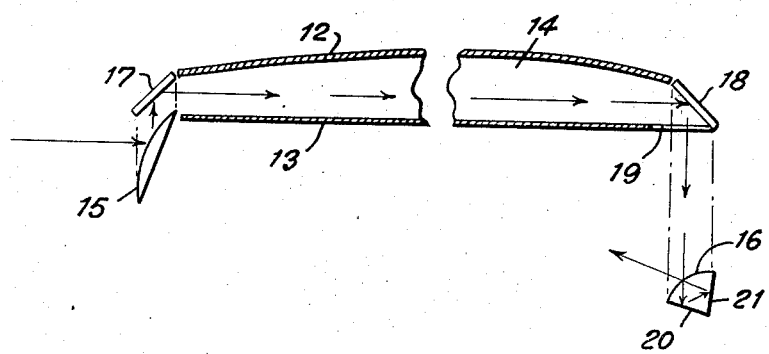
Figure 3:
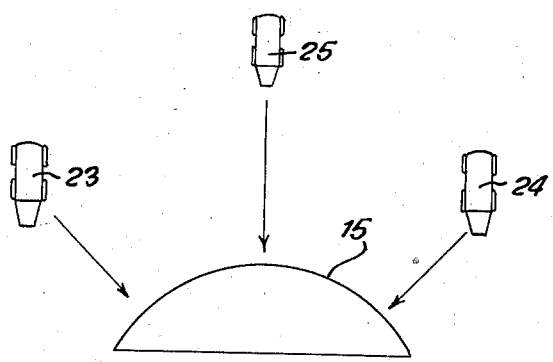

Fig. 1 is a side elevation of an automobile partly broken away to show the present invention, Fig. 2 is an enlarged view of the present invention, and Fig. 3 is a diagram in plan.

Referring to the drawing wherein I have shown, by way of illustration merely, an automobile 10, partly broken away at 11, to illustrate in a semi-diagrammatic way the present invention. The car 10 has the usual roof 12 and roof upholstery 13, which forms a tunnel 14 to permit the transfer of a rear view from a convex mirror 15 to the prismatic mirror 16.

The convex mirror 15 is located substantially near the roof of a car and adjacent to the rear thereof and above the rear window in a car. This mirror can be made of any suitable material such as glass or metal, and is so shaped that it will take in a field of vision at substantially 180° degrees. The rear view is then transferred to a second flat mirror 17 which is adjusted so that its line of incident will carry the view from the convex mirror 15 to a third flat mirror 18 located at the front of the car 10, adjacent the roof thereof.

The third flat mirror is then adjusted to transfer the view downwardly thru an opening 19 in the upholstery 13 onto a prismatic mirror 16 against the flat surface 20. When it strikes the flat surface 20 it is upside down so it is then reflected onto the flat surface 21 rightside up so that the driver can see just what is going on in the back of his car by glancing in the prismatic mirror mounted on the dash board 22.

It will be seen by referring to Fig. 3 that the cars 23 and 24 in the diagram will be seen in the prismatic mirror just as plainly as the car 25.

In the present type of rear vision mirror, it is impossible to see cars 23 and 24, and this of course is very dangerous in driving and many accidents occur when the cars 23 and 24 try to pass.

With the present invention it is hoped that accidents caused by obstructed vision will be reduced to a minimum.

It will be understood that all of these mirrors will be initially adjusted so that their angles of incident will be properly positioned to give a clear picture in the prismatic mirror 16 from the convex mirror 15.

It will also be understood that the convex mirror 15 and flat mirror 17 could be placed upside down if preferred without departing from the spirit of the invention. Many modifications for the present invention can be made without departing from the principle thereof.

I claim:

A device of the kind described comprising a convex mirror mounted substantially near the roof of a vehicle and adjacent the rear thereof, a second flat mirror mounted adjacent the convex mirror to receive the field of rear vision from said convex mirror, a third flat mirror mounted substantially near the roof of the vehicle and adjacent the front thereof to receive the reflected field of vision from the second flat mirror, a tunnel formed between the roof of the vehicle and the upholstery and substantially the width of the length of said second and third mirrors to permit of a free and unobstructed reflection from the second mirror to the third mirror, an opening in the upholstery below the third mirror to permit the reflection to travel downwardly, and a prismatic mirror mounted on the dashboard for receiving the reflections from the third flat mirror and transferring them to the driver.

LEVERETTE HOENINGHAUSEN.